United States Patent
Phan et al.

(10) Patent No.: US 11,644,842 B1
(45) Date of Patent: May 9, 2023

(54) SEMI-CLOSED LOOP ROLLOUTS FOR DATA AUGMENTATION

(71) Applicant: Motional AD LLC, Boston, MA (US)

(72) Inventors: Tung Minh Phan, Garden Grove, CA (US); Eric Wolff, Boston, MA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/808,472

(22) Filed: Jun. 23, 2022

(51) Int. Cl.
*G05D 1/02* (2020.01)
*G06N 20/00* (2019.01)
*G06K 9/62* (2022.01)

(52) U.S. Cl.
CPC ......... *G05D 1/0212* (2013.01); *G05D 1/0236* (2013.01); *G05D 1/0257* (2013.01); *G05D 1/0278* (2013.01); *G06K 9/6256* (2013.01); *G06K 9/6262* (2013.01); *G06N 20/00* (2019.01)

(58) Field of Classification Search
CPC .. G05D 1/0212; G05D 1/0236; G05D 1/0257; G05D 1/0278; G06N 20/00; G06K 9/6256; G06K 9/6262
USPC .......................................................... 701/23
See application file for complete search history.

(56) References Cited

U.S. PATENT DOCUMENTS

| | | | |
|---|---|---|---|
| 11,034,364 B1 * | 6/2021 | Narang | G06N 3/08 |
| 11,061,398 B2 * | 7/2021 | Levinson | G06Q 10/00 |
| 11,112,796 B2 * | 9/2021 | Djuric | G05D 1/0088 |
| 11,126,179 B2 * | 9/2021 | Karasev | G01S 13/931 |
| 11,157,010 B1 * | 10/2021 | Narang | G06N 3/088 |
| 11,210,744 B2 * | 12/2021 | Shalev-Shwartz | B60W 30/0956 |
| 11,345,340 B2 * | 5/2022 | Shalev-Shwartz | B60W 10/06 |
| 2017/0132334 A1 * | 5/2017 | Levinson | G01S 17/931 |
| 2018/0342069 A1 * | 11/2018 | Lim | G06T 7/0008 |
| 2018/0342113 A1 * | 11/2018 | Kislovskiy | G07C 5/008 |
| 2019/0049970 A1 * | 2/2019 | Djuric | B60W 60/00276 |
| 2019/0147610 A1 * | 5/2019 | Frossard | G06V 20/58 382/103 |

* cited by examiner

*Primary Examiner* — Yazan A Soofi
(74) *Attorney, Agent, or Firm* — Mintz Levin Cohn Ferris Glovsky and Popeo, P.C.

(57) ABSTRACT

Provided are methods for augmenting data related to generation of vehicle trajectories, which include predicting, using a machine learning model, a first trajectory of a vehicle at a first time in an environment surrounding the vehicle and including at least one object, detecting a deviation of the predicted first trajectory at the first time from a first ground truth trajectory of the vehicle and determining that, at the first time, the deviation satisfies a threshold, predicting, using the machine learning model, a second trajectory of the vehicle based on the predicted first trajectory of the vehicle and a second ground truth trajectory of at least one object at a second time being subsequent to the first time, and generating a training dataset for training the machine learning model using the predicted first and second trajectories of the vehicle. Systems and computer program products are also provided.

29 Claims, 9 Drawing Sheets

SEMI-CLOSED LOOP ROLLOUTS FOR DATA AUGMENTATION

BACKGROUND

An autonomous vehicle is capable of sensing its surrounding environment and navigating without human input. Upon receiving data representing the environment and/or any other parameters, the vehicle performs processing of the data to determine its movement decisions, e.g., stop, move forward/reverse, turn, etc. The decisions are intended to safely navigate the vehicle along a selected path to avoid obstacles and react to a variety of scenarios, such as, presence, movements, etc. of other vehicles, pedestrians, and/or any other objects.

DETAILED DESCRIPTION

Figure 1:
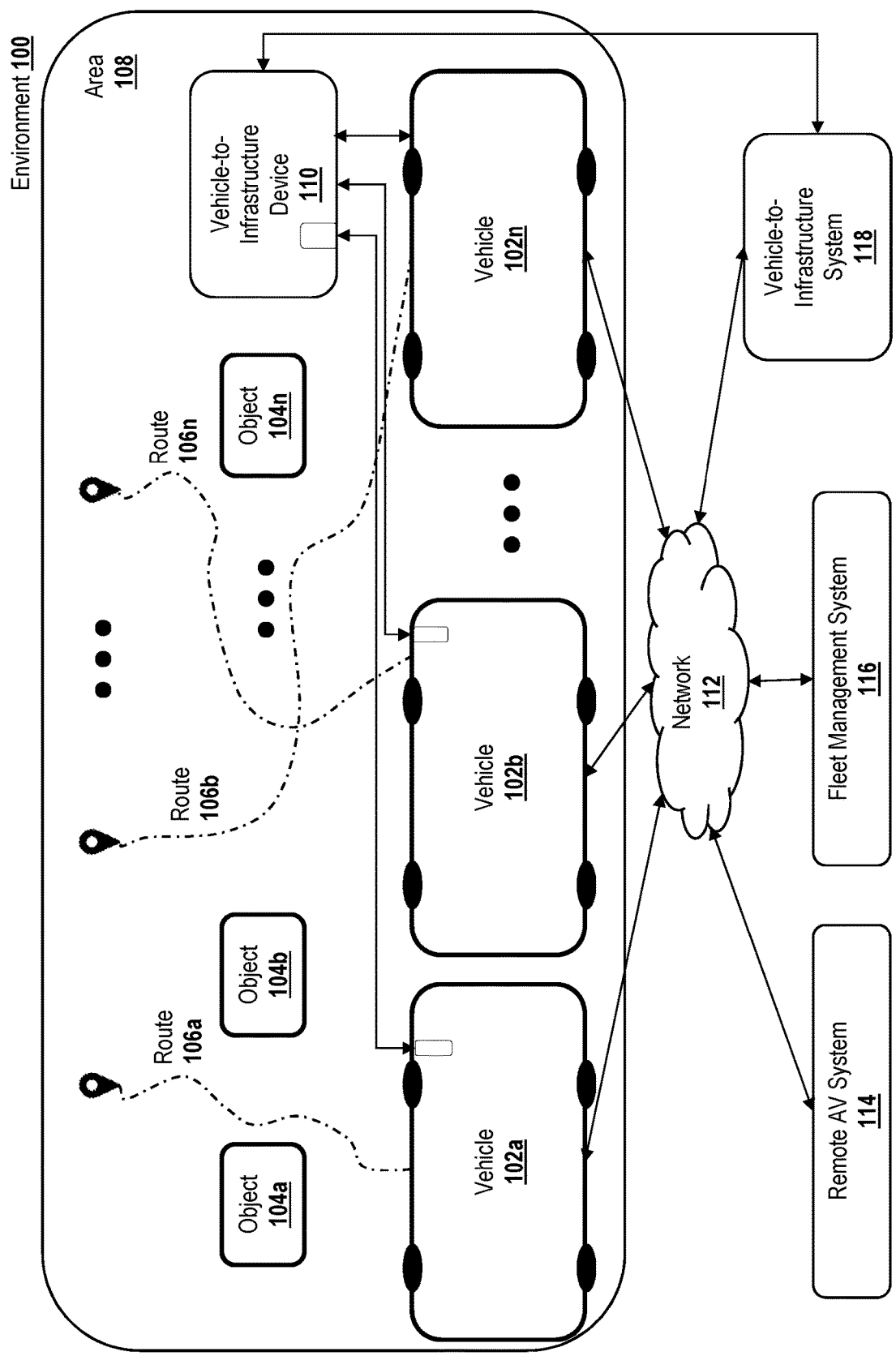
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement generation of vehicle travel trajectories. Subsequent trajectories for a vehicle (such an, for example, an autonomous vehicle) are generated using deviations and/or errors in trajectory predictions resulting from application of machine learning (ML) models. Training datasets for ML models deployed in vehicles include simulated and/or real-world vehicle trajectories determined over multiple time-steps and/or times (sometimes, also referred to, as "expert data"). The ML models are trained by comparing and/or matching the expert data to/with trajectories generated by the ML models.

The current subject matter can be configured to generate a training dataset using two and/or more trajectory predictions of ML module. One of the trajectory predictions (e.g., a second and/or a subsequent trajectory prediction) can be generated for scenarios where an initial trajectory prediction does not significantly deviate from a ground truth trajectory. For example, the deviation is small enough such that the environment of the vehicle remains in the ground truth trajectory (e.g., that the vehicle's trajectory is the same as its ground truth trajectory).

In some example embodiments, a planner component and/or a planning system and/or a planner of the autonomous vehicle can be configured to generate a prediction of a first trajectory of the vehicle. One or more machine learning models can be used to generate such predictions. The first trajectory can be generated during and/or at a first time step and/or first time. The first trajectory may represent a vehicle's travel path in a particular environment that may be surrounding the vehicle and/or in which the vehicle may be present. The environment may and/or may not include another object, such as, for example, a pedestrian, another vehicle, a roadside structure, etc.

Once the first trajectory has been generated, the planner may be configured to detect (e.g., using one or more sensors of the vehicle) that the vehicle travel path has deviated from the predicted first trajectory. The deviation can be measured in terms of speed, direction (e.g., angle of travel, heading, etc.), and/or any other travel parameters. The trajectory deviation can be measured in relation at the first time and can be measured in relation to a first ground truth trajectory. The first ground truth trajectory can correspond to one or more of the following a simulated trajectory, a real-life trajectory, etc. of the vehicle. The planner can also determine that, at the first time, the detected deviation satisfies a predetermined threshold (e.g., exceeds a deviation threshold, etc.). The threshold can be a preset value.

The vehicle's planner can then use one or more machine learning models to predict a second trajectory of the vehicle. The prediction can be based on at least one of the following: the predicted first trajectory and/or a second ground truth trajectory of at least one object in the vehicle's environment. The prediction can be made at a second time, which is subsequent to the first time.

The planner can then generate a training dataset for training the machine learning model using the predicted first and second trajectories of the vehicle.

In some embodiments, the current subject matter can include one or more of the following optional features. For example, the planner can also simulate the vehicle's environment to generate the first ground truth trajectory of the vehicle at the first time. A high-fidelity simulator can be used for the purposes of such simulation. In some embodiments, the planner can simulate a second ground truth trajectory of at least one object at the second time based on a determination that the first trajectory of the vehicle at the first time matches the first ground truth trajectory of the vehicle at the first time.

In some embodiments, the planner can also simulate the first environment to generate a third ground truth trajectory of the vehicle at the second time. Again, a high-fidelity simulator can be used. The simulator can simulate the second ground truth trajectory of at least one object at the second time based on a determination that the second trajectory of the vehicle at the second time matches the third ground truth trajectory of the vehicle at the second time.

In some embodiments, the planner can execute training of the machine learning model using the generated training dataset. The planner can implement a loss function for the purposes of training the machine learning model using the generated training dataset. The loss function can include at least one of the following: a loss function associated with predicting the first trajectory, a loss function associated with predicting the second trajectory, and/or any other loss function.

In some embodiments, the detected deviation can include a difference between at least one of the following: a speed and/or a direction of the predicted first trajectory and the first ground truth trajectory of the vehicle.

In some embodiments, the machine learning model can include an inverse reinforcement learning (IRL) model.

In some embodiments, the planner can also receive various vehicle sensor data and/or sensor information (e.g., radar signal(s), image(s), LiDAR signal(s), GPS signal(s), etc.) about a second (and/or any other) environment that can include the vehicle. Once such sensor data/information is received, the planner can predict a third trajectory of the vehicle in the second environment based on the received sensor information. The prediction can be based on the trained machine learning model. The vehicle can be operated in a third environment based on the predicted third trajectory.

By virtue of the implementation of systems, methods, and computer program products described herein, techniques for training of machine learning models over multiple time-steps (e.g., versus a single time-step or snapshot), which allows the machine learning models to learn to plan for future time-steps. Further, because the techniques use the errors or deviations of the machine learning models themselves, the machine learning models are exposed to their own distribution shifts during training or iterative evaluation, justifying independent and identical distribution assumption associated with training datasets when training the machine learning models. This may also for a more precise prediction and/or generation of vehicle trajectories.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
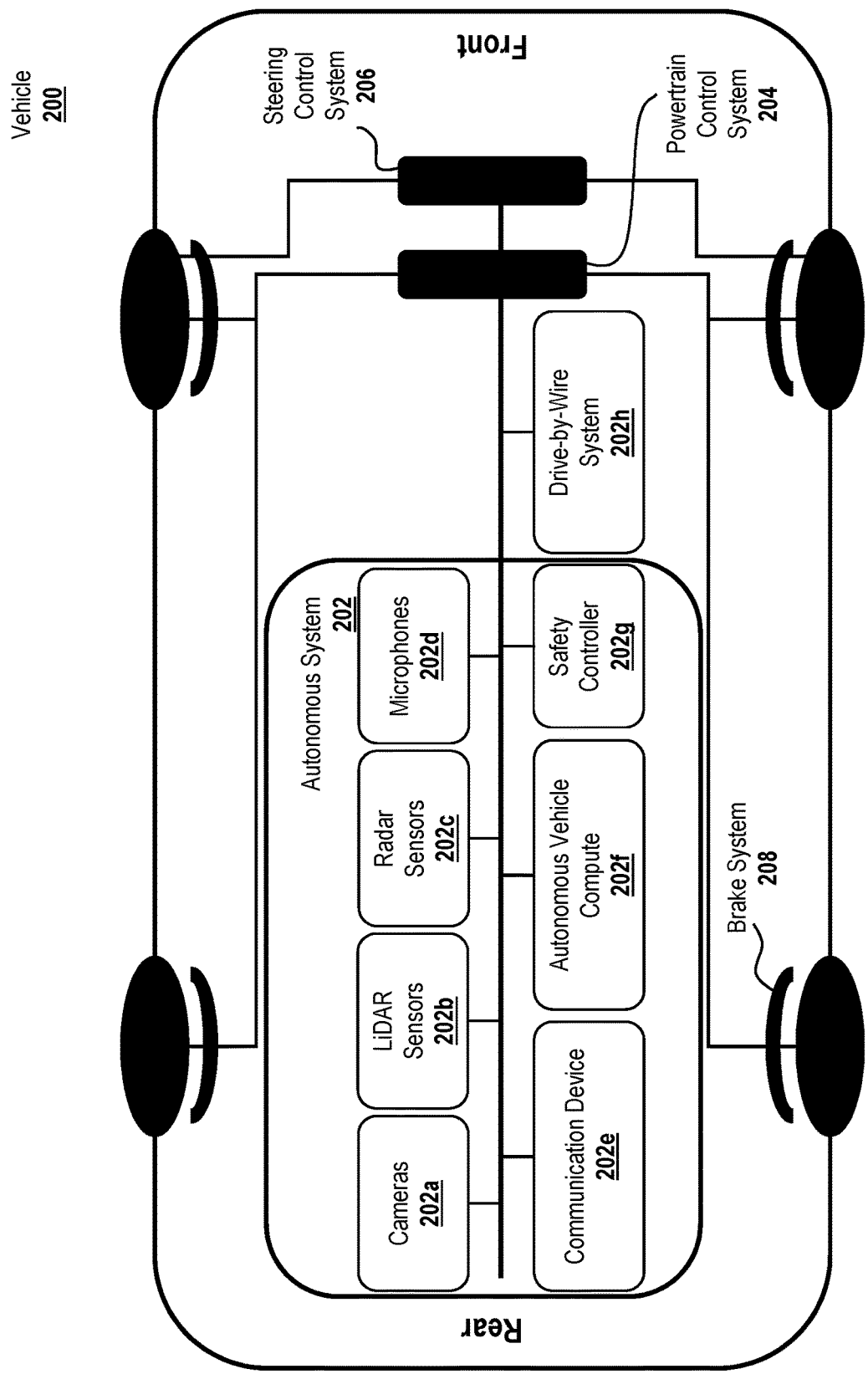
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operation or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
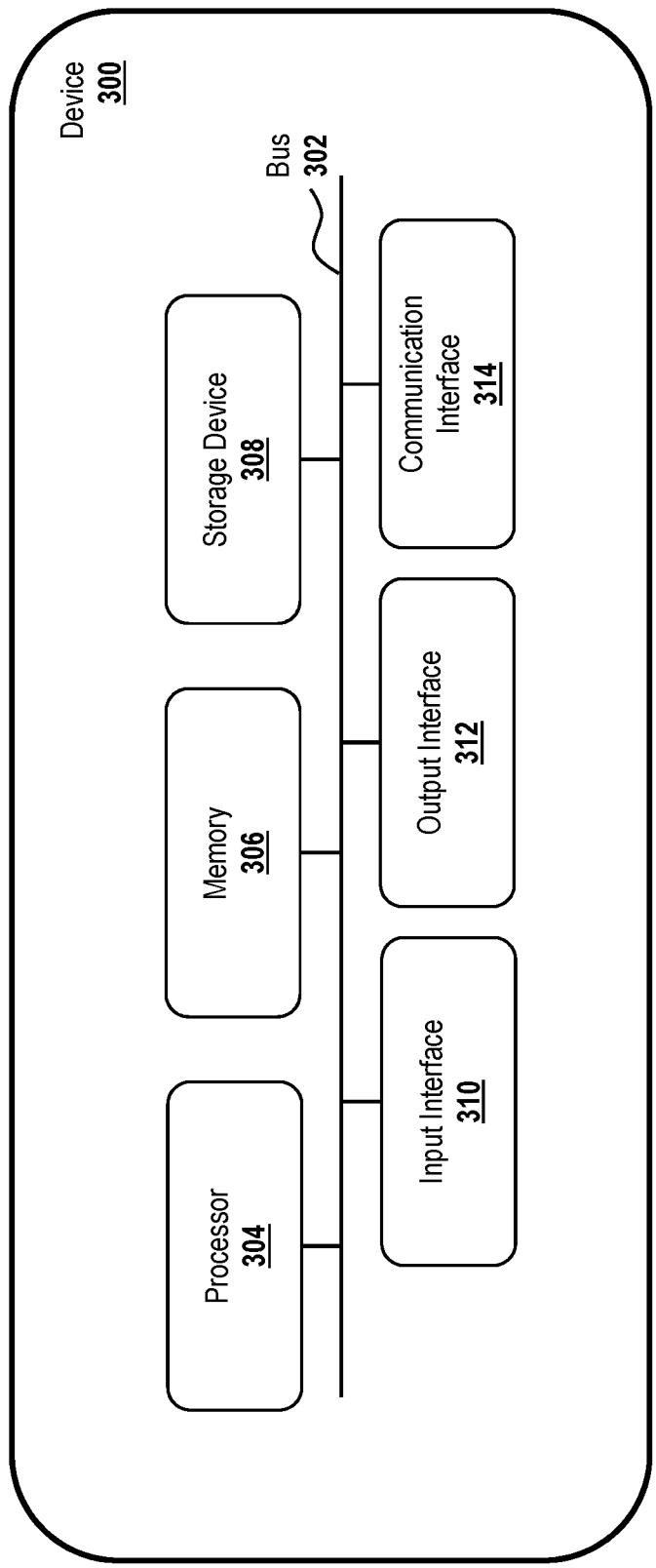
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charged-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of vehicle 200, and/or one or more devices of network 112 (e.g., one or more devices of a system of network 112). In some embodiments, one or more devices of vehicles 102 (e.g., one or more devices of a system of vehicles 102), at least one device of vehicle 200, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like. In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4A:
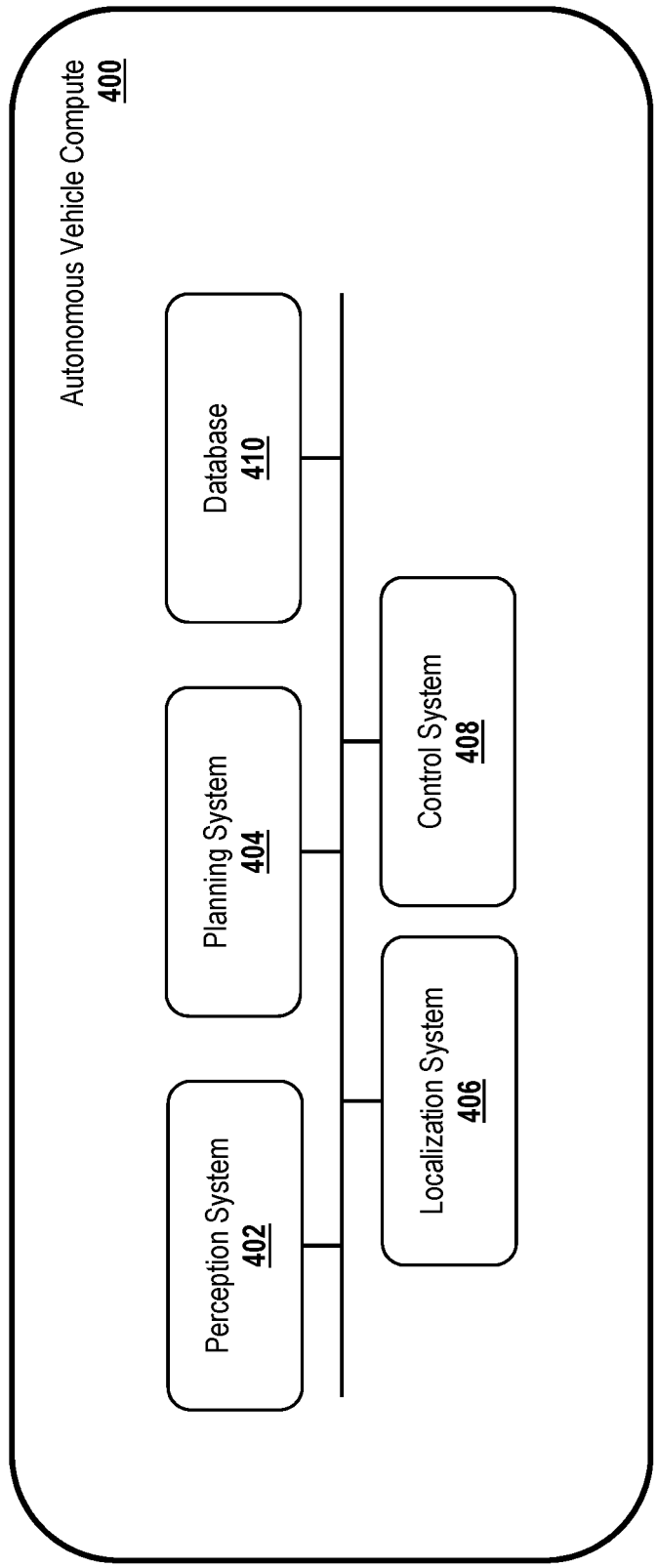
FIG. 4A is a diagram of certain components of an autonomous system.
Figure 4B:
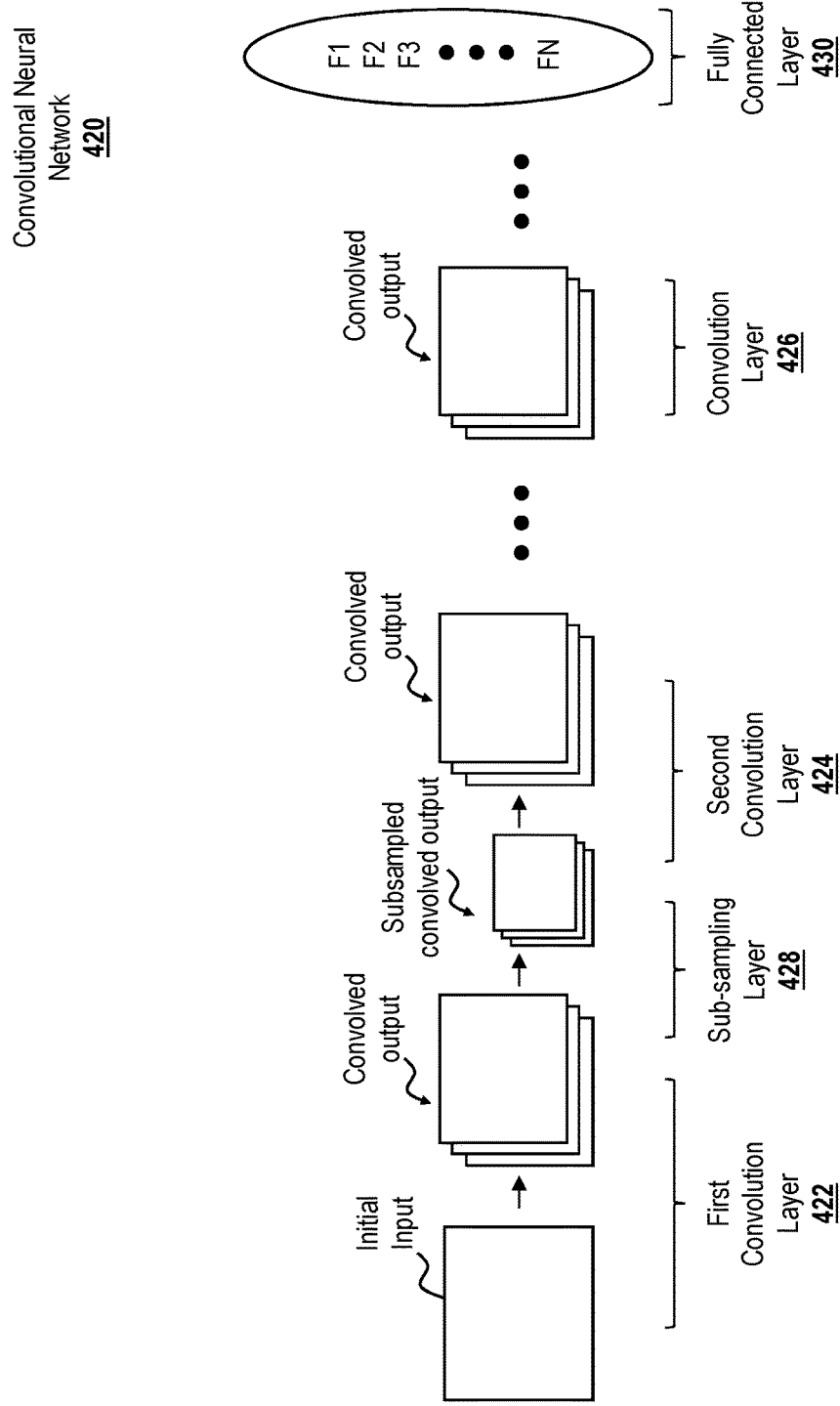
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of subsampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430.

In some examples, perception system 402 provides the output of convolution layer 426 as fully connected layer 430, where fully connected layer 430 includes data associated with a plurality of feature values referred to as F1, F2 ... FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, ... FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
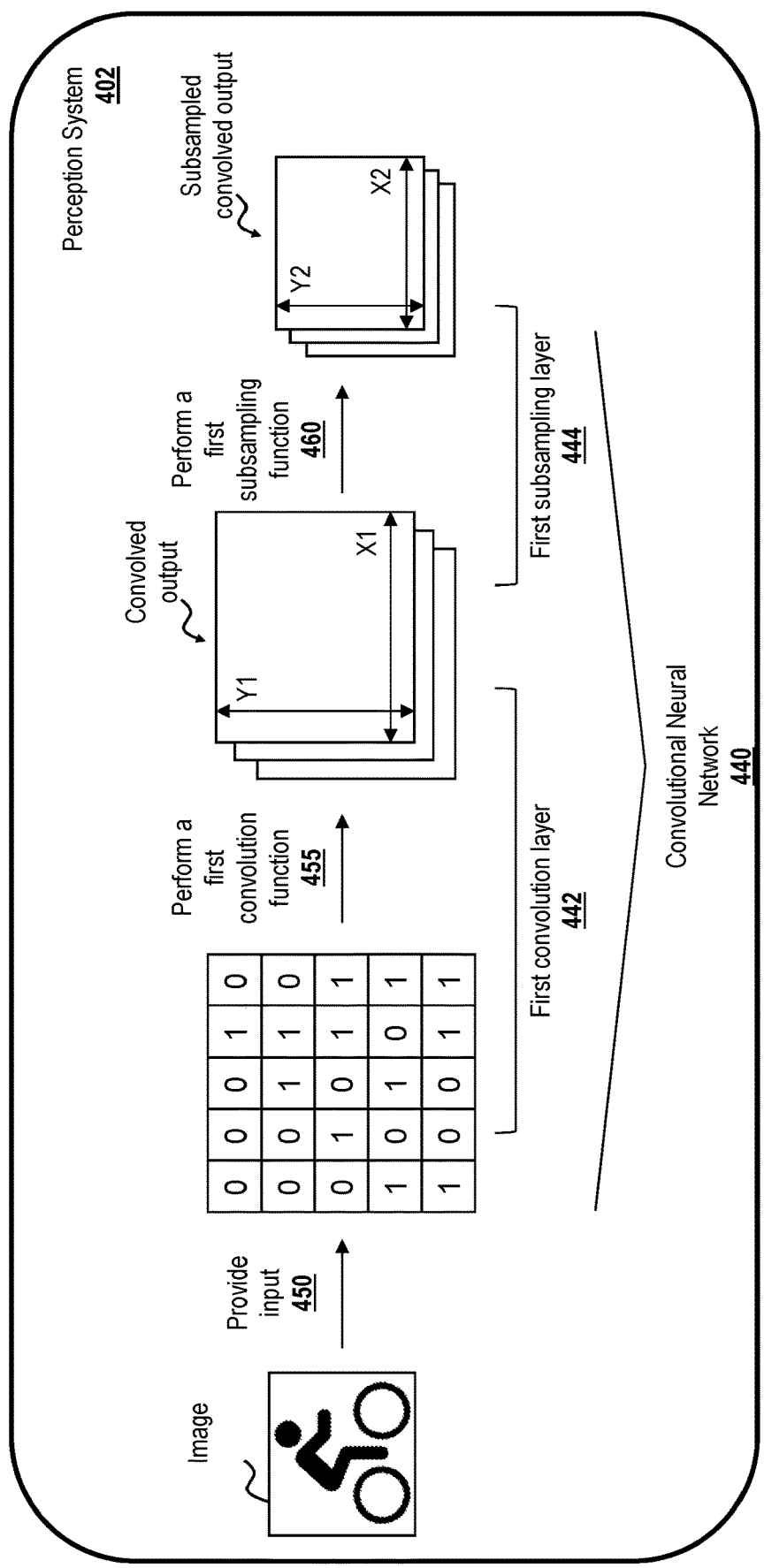
FIGS. 4C and 4D are a diagram illustrating example operation of a CNN.
Figure 4D:
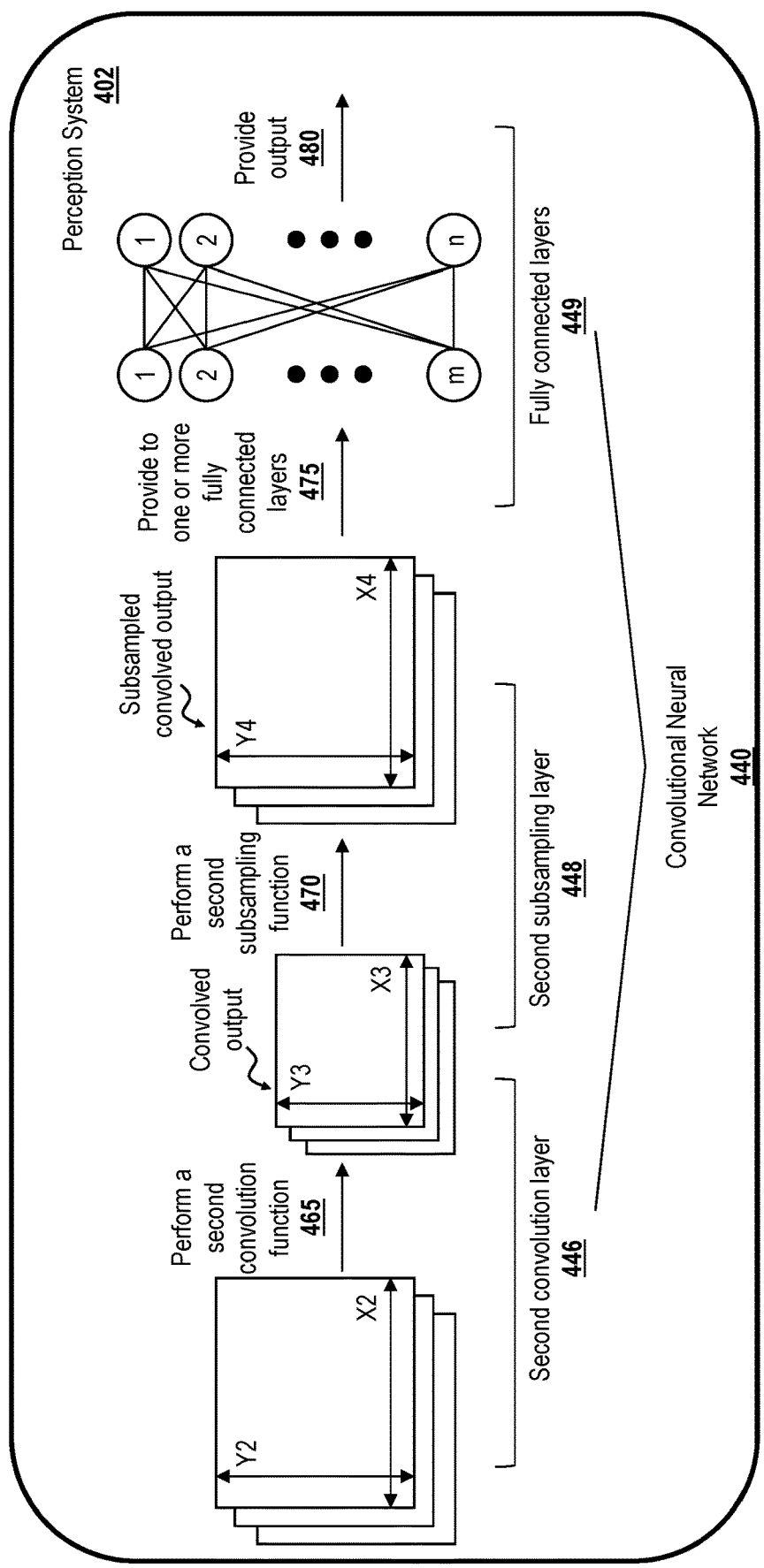

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Figure 5:
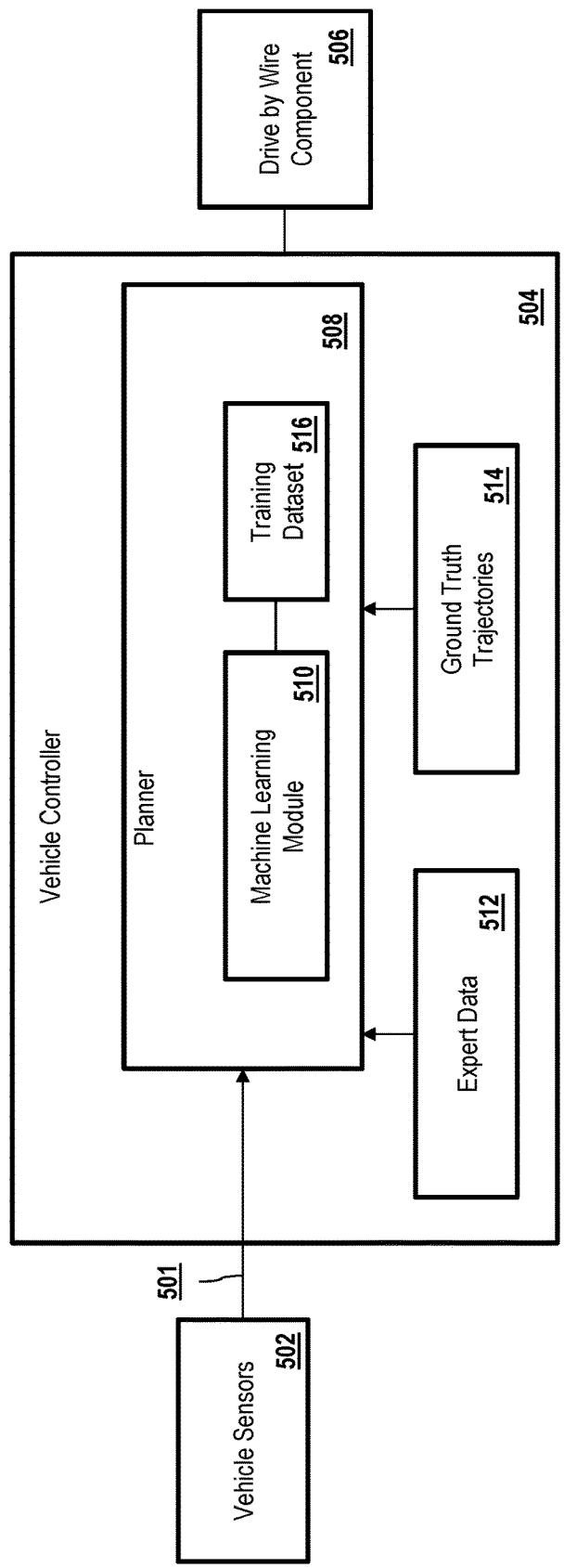
FIG. 5 a diagram of an implementation of a system for augmenting data related to generating one or more vehicle trajectories in a planner.
Figure 6:
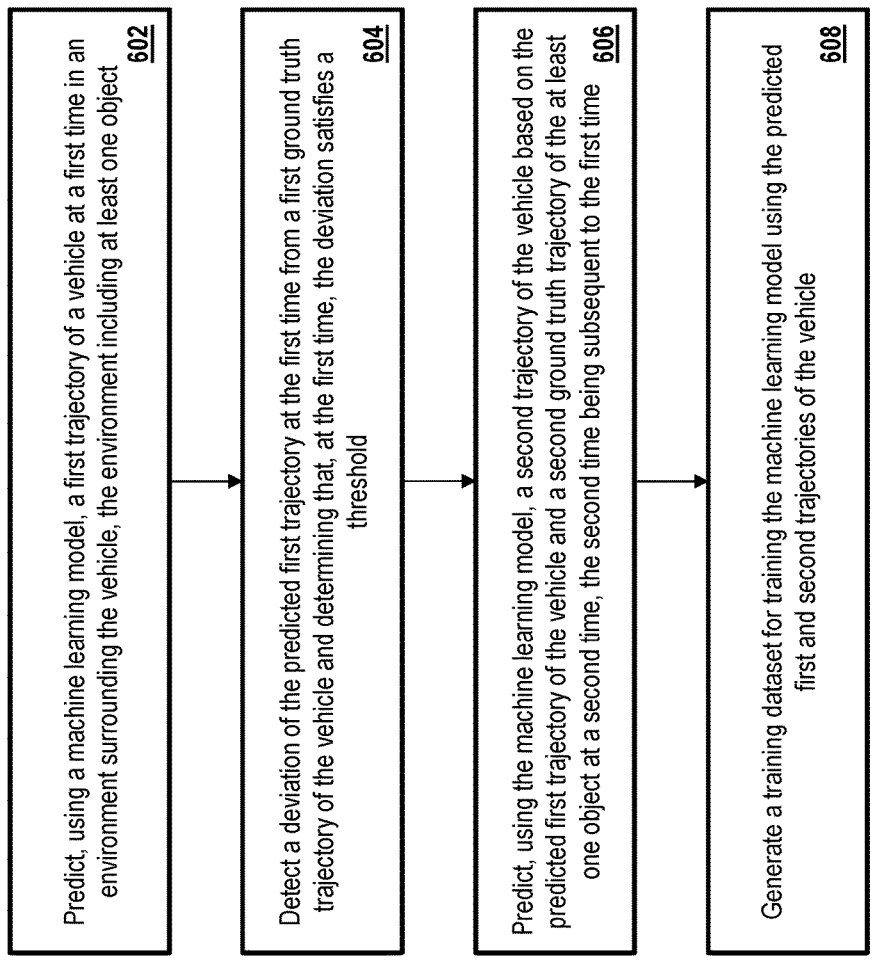
FIG. 6 is a flow chart illustrating an example of a process for augmenting data related to generating vehicle trajectories.

Referring now to FIG. 5, illustrated is a diagram of an implementation of a system for augmenting data related to generating one or more vehicle trajectories in a planner. FIG. 6 is a flow chart illustrating an example of a process for augmenting data related to generating vehicle trajectories.

As stated above, a vehicle (e.g., an autonomous vehicle) includes sensors that monitor various parameters associated with the vehicle. For example, some sensors monitor/detect changes occurring in the vehicle's environment, while others monitor/detect various aspects associated with operational aspects of the vehicle. Any information/data transmitted by the sensors to the vehicle's controller (or any other processing component) is used by the controller's planner component ("planner") to determine and/or predict a path of travel, direction, speed, and/other movement and/or maneuver parameters.

A planner can include a machine learning module that can be configured to learn to select a decision from a large (e.g., continuous) decision space based on information (e.g., sensor data, environment data, vehicle health information, etc.) that is available to it up to a certain point in time and the decision it makes at each instant will affect, via some function $f$, the information that it sees during the next time steps and thus, its future decisions. The function $f$ may be complex and unknown, and/or known yet involving non-differentiable operations (such as, for example, a high-fidelity simulator) but may be expensive and/or very difficult to compute. What is available as training data however are sequences of decisions that an "expert" driver makes over time as well as function fs outputs as one or more consequences of those decisions. When $f$ is non-differentiable, machine learning module's decisions cannot be propagated over multiple time steps to match the corresponding ones from the "expert" driver. Being restricted to training on one timestep (e.g., a snapshot) therefore can deprive the machine learning model of the opportunity to learn to plan for future steps, which may result in a large distribution shifts over time during iterative evaluation. The current subject matter can be configured to address the above issue through various data augmentation, as discussed herein. In some embodiments, the planner is a differentiable or non-differentiable planner.

In some embodiments, function $f$ can be decomposed into two parts. One part can include a non-computable and/or very computationally expensive function $f'$ (e.g., corresponding to the real world and/or a simulator). Another part can include one or more potentially non-differentiable functions that can act on outputs of the simulator. When the space of decisions is continuous and the function $f$ is assumed to be sufficiently continuous, the current subject matter can assume that a small deviation of the first prediction from a ground truth (e.g., a first ground truth) does not affect an output of function $f'$ and thus, any results can be "replayed" for the expert data as a substitute.

Then, a next prediction can be determined based on the first prediction and the replayed world, where gradients for it can be back-propagated (whether these gradients can go all the way to the very first input depends on the differentiability of functions and whether the machine learning model is outputting its decisions in a differentiable manner).

The above procedure exposes the machine learning model to its own distribution shift during training, thereby making the independent and identically distributed assumption on train-test sets more justifiable.

For example, during training of some of inverse reinforcement learning (IRL) models, the training data may be made to look similar to the "simulated" data used in closed loop evaluation, which involves iterative rollouts of the model's policy. Further, during training, one or more scenarios may be selected where the machine learning model is performing very well on and roll them forward by k time steps (the duration the best action is held for during closed loop evaluation). Since the best action according to the model may be slightly different from that of the ground truth, the ego vehicle's past and current states in the rolled out scenario may be different from those in the collected data. This is the intended effect that makes the training distribution look more like that during evaluation. The loss for the new scenario will then be added the old scenario's loss or replace it during the batch loss computation. Depending on the dataset, for each scenario, the above process may be repeated for as many times as there is future data for doing so.

FIG. 5 illustrates an example of a system 500 implementing a vehicle trajectory planner, according to some embodiments of the current subject matter. The system 500 can be incorporated into a vehicle (e.g., vehicle 102 shown in FIG. 1, vehicle 200 shown in FIG. 2, etc.). The system 500 includes one or more sensors 502, a vehicle controller 504, and drive-by-wire (DBW) component 506. The system 500 can also incorporate other components associated with operation of an autonomous vehicle (as described above). The vehicle controller 504 can include a planner component 508 that includes a machine learning component 510 (similar to those discussed above in connection with FIGS. 4B-4D), and an expert data component 512.

The vehicle's sensors 502 monitor various parameters and/or sets of parameters associated with the vehicle. The parameters can include, but are not limited to, parameters associated with vehicle's state, e.g., heading, driving speed, etc. Additionally, the parameters can include, but are not limited to, parameters associated with vehicle's health, e.g., tire inflation pressure, oil level, transmission fluid temperature, etc. The vehicle's sensors (e.g., camera, LIDAR, SONAR, etc.) can further monitor various parameters associated an environment surrounding the vehicle. These parameters can include, but are not limited to, parameters associated with other vehicles (e.g., speed, direction, etc.) and/or other objects (e.g., pedestrian stepping out on a roadway in front of the vehicle). The sensors 502 supply data for one or more measured/monitored parameters to the vehicle controller 504, at 501. Additionally, the expert data parameters 512 are provided to the planner component 508.

Using the planner component's machine learning module 510, the planner component 508 can execute a process related to generation of prediction of a first trajectory of a vehicle (e.g., autonomous vehicle shown in FIGS. 1-3). One or more machine learning models that can be selected and/or retrieved from the module 510 can be used for generating trajectory predictions. Such trajectory predictions can be generated during and/or at a first time step and/or first time and/or first point in time. As stated above, trajectories represent a vehicle's travel path in a particular environment. The environment can include the vehicle and/or another object, e.g., a pedestrian, another vehicle, a roadside structure, etc.

The planner 508, using the predicted first trajectory and/or any sensor data 501 can determine and/or detect that the vehicle travel path has deviated from the predicted first trajectory. The data 501 can be used to measure such deviation. For example, the deviation can be measure in terms of change of speed, direction (e.g., angle of travel, heading, etc.), and/or any other travel parameters. The planner 508 can determine that the vehicle deviated from its predicted trajectory at a first time (e.g., first time step, first point in time, etc.). One or more ground truth trajectories, which can be determined by the planner 508 and/or otherwise retrieved/selected from/using ground truth trajectories component 514 (e.g., that may be determined based on previously computed ground truth trajectories). The deviation can be determined and/or measured in relation to a first ground truth trajectory. The first ground truth trajectory can correspond to one or more of the following: a simulated trajectory, a real-life trajectory, etc. of the vehicle, where such trajectories can be determined and/or selected from the component 514. The planner 508 can also determine that, at the first time, the detected deviation satisfies a predetermined threshold (e.g., exceeds a deviation threshold, etc.). The threshold can be a preset value. In an example, the threshold is a maximum time-discounted error of 0.5 m from a trajectory that lasts, e.g., 6 seconds. A time-discounted error is an error that has a lower penalty as it occurs at later timestamps in the trajectory. For example, the discount rate is 0.9 for every second.

The planner 508 then uses the module 510 to obtain one or more machine learning models for predicting a second trajectory of the vehicle. The planner 510 generates its prediction based on at least one of the following: the predicted first trajectory of the vehicle and/or a second ground truth trajectory of at least one object in the vehicle's environment. The second ground truth trajectory of objects in the vehicle's environment (e.g., a pedestrian crossing the road, etc.) can be determined by the planner 508 and/or retrieved from the component 514. The prediction can be made at another and/or second time that occurs after and/or is subsequent to the first time. The planner 508 then generates a training dataset 516 to train the machine learning model using the predicted first and second trajectories of the vehicle.

In some embodiments, as a result of the above process, the planner generates an output signal (e.g., representative of a vehicle travel trajectory), which can be transmitted by the vehicle controller 504 to the drive-by-wire component 506 so that the vehicle can execute one or more determined maneuvers subject to the determined trajectory(ies). The above training process can be executed by the vehicle controller 504 while the vehicle is operating (i.e., at drive time). Alternatively, or in addition to, the training process can be executed while the vehicle is not operating.

FIG. 6 is a flow diagram illustrating an example process 600 for augmenting data related to generating one or more trajectories, according to some implementations of the current subject matter. The process 600 can be executed using the system 500 shown in FIG. 5. In particular, the planner component 508 can be configured to execute the process 600.

At 602, the planner 508, using a machine learning model (e.g., as available from the machine learning module 510), can determine and/or predict a first trajectory of a vehicle at a first time in an environment surrounding the vehicle. The environment can include at least one object, such as, a pedestrian, another vehicle, a roadside structure, etc. As stated above, the first trajectory can represent a vehicle's travel path in the environment that may be surrounding the vehicle and/or in which the vehicle may be present.

At 604, the planner 508 can detect a deviation of the predicted first trajectory at the first time from a first ground truth trajectory. The ground truth trajectories can be separately determined by the planner 508 and/or selectable from component 514. The ground truth trajectories can include simulated trajectories, real-life trajectories, etc. of the vehicle. The detection can be performed using one or more sensors 502 of the vehicle. Using the data 501 received from the sensors 502, the planner 508 can determine that a deviation has occurred.

The planner 508 can also compare the detected deviation to a predetermined threshold. The comparison can take place at the first time. Moreover, the deviation can be measured and/or related to vehicle's speed, direction (e.g., angle of travel, heading, etc.), and/or any other travel parameters. The trajectory deviation can be measured in relation at the first time and can be measured in relation to the first ground truth trajectory, as determined by the planner 508 and/or available from component 514.

At 606, the planner can generate a prediction (e.g., using the machine learning model available from the component 510) of a second trajectory of the vehicle. The prediction can be based on at least one of the following: the predicted first trajectory and/or a second ground truth trajectory of at least one object in the vehicle's environment. Alternatively, or in addition, both the predicted first trajectory and the second ground truth trajectory as it related to the object in the environment can be used. The planner 508 makes such prediction at a second time that occurs after the first time. In some embodiments, a machine learning model includes an inverse reinforcement learning (IRL) model. In some embodiments, the machine learning model is any model that executes a prediction sequentially and iteratively.

At 608, the planner generates the training dataset 516 for to train the machine learning model. The model is trained using the predicted first and second trajectories of the vehicle.

In some embodiments, the planner 508 can use one of the existing ground truth trajectories that can be available from component 514. Alternatively, or in addition, the planner simulate the vehicle's environment to generate the first ground truth trajectory of the vehicle at the first time. For example, a high-fidelity simulator is used for the simulation. An example of a high-fidelity simulator is the CARLA autonomous vehicle simulator. The planner 508 can also simulate a second ground truth trajectory of objects in the vehicle's environment (e.g., a pedestrian is crossing the street) at the second time. The simulation is based on a determination that the first trajectory of the vehicle at the first time matches the first ground truth trajectory of the vehicle.

In some embodiments, the planner 508 can be further configured to use a high-fidelity simulator to simulate the first environment to generate yet a further ground truth trajectory of the vehicle at the second time. Moreover, the same simulator can be used to simulate the second ground truth trajectory of objects in the vehicle's environment at the second time. The simulation can rely on a determination that the second trajectory of the vehicle matches the third ground truth trajectory of the vehicle at the second time.

In some embodiments, the planner 508, upon generation of the training data set 516, can perform training of the machine learning model using such dataset. For example, a loss function can be used to train the machine learning model. Examples of the loss function include at least one of the following: a loss function associated with predicting the first trajectory, a loss function associated with predicting the second trajectory, and/or any other loss function. In some examples, the output of the loss function is added to output of a prior scenario, e.g., if output for the prior scenario satisfies an error threshold.

In some embodiments, at stated above, the planner 508 receives various vehicle sensor data and/or sensor information (e.g., radar signal(s), image(s), LiDAR signal(s), GPS signal(s), etc.) about a second and/or any other environment that can include the vehicle. Once such sensor data/information is received, the planner 508 predicts a further (e.g., third) trajectory of the vehicle in such second environment based on the received sensor information. The prediction is based on the trained machine learning model that was trained using the training dataset 516. The vehicle can be operated in a third environment based on the predicted third trajectory.

In some embodiments, process 600 repeats, e.g., for k steps. For example, from an initial environment (e.g., at time index t=0), the process is carried out to predict a future trajectory. The vehicle proceeds along that future trajectory to the next time index (e.g., t=1). The process repeats until a) the vehicle state is too far (e.g., beyond a threshold) from the ground truth state, or b) k steps have been carried out. For example, every predicted future trajectory is compared to the ground truth (e.g., appropriately shifted in time).

Further non-limiting aspects or embodiments are set forth in the following numbered clauses:

Clause 1: A method, comprising: predicting, using at least one processor, using a machine learning model, a first trajectory of a vehicle at a first time in an environment surrounding the vehicle, the environment including at least one object; detecting, using the at least one processor, a deviation of the predicted first trajectory at the first time from a first ground truth trajectory of the vehicle and determining that, at the first time, the deviation satisfies a threshold; predicting, using the at least one processor, using the machine learning model, a second trajectory of the vehicle based on the predicted first trajectory of the vehicle and a second ground truth trajectory of the at least one object at a second time, the second time being subsequent to the first time; and generating, using the at least one processor, a training dataset for training the machine learning model using the predicted first and second trajectories of the vehicle.

Clause 2: The method of clause 1, further comprising simulating, using a high-fidelity simulator, the environment to generate the first ground truth trajectory of the vehicle at the first time.

Clause 3: The method of clause 2, wherein the second ground truth trajectory of the at least one object at the second time is simulated based on a determination that the first trajectory of the vehicle at the first time matches the first ground truth trajectory of the vehicle at the first time.

Clause 4: The method of any of the preceding clauses, further comprising simulating, using a high-fidelity simulator, the first environment to generate a third ground truth trajectory of the vehicle at the second time.

Clause 5: The method of clause 4, wherein the second ground truth trajectory of the at least one object at the second time is simulated based on a determination that the second trajectory of the vehicle at the second time matches the third ground truth trajectory of the vehicle at the second time.

Clause 6: The method of any of the preceding clauses, further comprising: training the machine learning model using the generated training dataset.

Clause 7: The method of clause 6, wherein a loss function for the training the machine learning model using the generated training dataset includes at least one of: a loss function associated with the predicting the first trajectory and a loss function associated with the predicting the second trajectory.

Clause 8: The method of any of the preceding clauses, wherein the deviation includes a difference between at least one of a speed and a direction of the predicted first trajectory of the vehicle and the first ground truth trajectory of the vehicle.

Clause 9: The method of any of the preceding clauses, wherein the machine learning model includes an inverse reinforcement learning (IRL) model.

Clause 10: The method of any of the preceding clauses, further comprising: receiving, using the at least one processor, sensor information (e.g., radar signal, images, LiDAR signal, GPS signal, etc.) about a second environment including the vehicle; predicting, using the trained machine learning model, a third trajectory of the vehicle in the second environment based on the received sensor information; and operating, using the at least one processor, the vehicle in the third environment based on the predicted third trajectory.

Clause 11: A system, comprising: at least one processor, and at least one non-transitory storage media storing instructions that, when executed by the at least one processor, cause the at least one processor to perform operations of any of the preceding clauses 1-10.

Clause 12: At least one non-transitory storage media storing instructions that, when executed by at least one processor, cause the at least one processor to perform operations of any of the preceding clauses 1-10.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
   predicting, by at least one processor, using a machine learning model, a first trajectory of a vehicle at a first time in a simulated environment that is simulated as surrounding the vehicle, the simulated environment comprising at least one object;
   receiving, by the at least one processor, from a simulator, environmental parameters characterizing the simulated environment surrounding the vehicle;
   detecting, by the at least one processor, based on processing the environmental parameters, a deviation of the first trajectory at the first time from a first ground truth trajectory of the vehicle and determining that, at the first time, the deviation satisfies a threshold;
   predicting, by the at least one processor, using the machine learning model, a second trajectory of the vehicle based on the first trajectory of the vehicle and a second ground truth trajectory of the at least one object at a second time, the second time being subsequent to the first time; and
   generating, by the at least one processor, a training dataset for training the machine learning model using the predicted first and second trajectories of the vehicle.

2. The method of claim 1, further comprising simulating, using the simulator, the simulated environment to generate the first ground truth trajectory of the vehicle at the first time.

3. The method of claim 2, wherein the second ground truth trajectory of the at least one object at the second time is simulated based on a determination that the first trajectory of the vehicle at the first time matches the first ground truth trajectory of the vehicle at the first time.

4. The method of claim 1, further comprising simulating, using the simulator, a first environment to generate a third ground truth trajectory of the vehicle at the second time.

5. The method of claim 4, wherein the second ground truth trajectory of the at least one object at the second time is simulated based on a determination that the second trajectory of the vehicle at the second time matches the third ground truth trajectory of the vehicle at the second time.

6. The method of claim 1, further comprising: training the machine learning model using the training dataset.

7. The method of claim 6, wherein a loss function for the training the machine learning model using the training dataset comprises at least one of: a loss function associated with the predicting the first trajectory and a loss function associated with the predicting the second trajectory.

8. The method of claim 1, wherein the deviation comprises a difference between at least one of a speed and a direction of the first trajectory of the vehicle and the first ground truth trajectory of the vehicle.

9. The method of claim 1, wherein the machine learning model comprises an inverse reinforcement learning (IRL) model.

10. The method of claim 1, further comprising:
receiving, by the at least one processor, sensor information (e.g., radar signal, images, LiDAR signal, GPS signal, etc.) about a second environment comprising the vehicle;
predicting, by the machine learning model, a third trajectory of the vehicle in the second environment based on the sensor information; and
operating, by the at least one processor, the vehicle in a third environment based on the third trajectory.

11. A system comprising:
at least one processor, and
at least one non-transitory storage media storing instructions that, when executed by the at least one processor, cause the at least one processor to perform operations comprising:
predicting, by at least one processor, using a machine learning model, a first trajectory of a vehicle at a first time in a simulated environment that is simulated as surrounding the vehicle, the simulated environment comprising at least one object;
receiving, by the at least one processor, from a simulator, environmental parameters characterizing the simulated environment surrounding the vehicle;
detecting, by the at least one processor, based on processing the environmental parameters, a deviation of the first trajectory at the first time from a first ground truth trajectory of the vehicle and determining that, at the first time, the deviation satisfies a threshold;
predicting, by the at least one processor, using the machine learning model, a second trajectory of the vehicle based on the first trajectory of the vehicle and a second ground truth trajectory of the at least one object at a second time, the second time being subsequent to the first time; and
generating, by the at least one processor, a training dataset for training the machine learning model using the predicted first and second trajectories of the vehicle.

12. The system of claim 11, the operations further comprising simulating, using the simulator, the simulated environment to generate the first ground truth trajectory of the vehicle at the first time.

13. The system of claim 12, wherein the second ground truth trajectory of the at least one object at the second time is simulated based on a determination that the first trajectory of the vehicle at the first time matches the first ground truth trajectory of the vehicle at the first time.

14. The system of claim 11, the operations further comprising simulating, using the simulator, a first environment to generate a third ground truth trajectory of the vehicle at the second time.

15. The system of claim 14, wherein the second ground truth trajectory of the at least one object at the second time is simulated based on a determination that the second trajectory of the vehicle at the second time matches the third ground truth trajectory of the vehicle at the second time.

16. The system of claim 11, the operations further comprising: training the machine learning model using the training dataset.

17. The system of claim 16, wherein a loss function for the training the machine learning model using the training dataset comprises at least one of: a loss function associated with the predicting the first trajectory and a loss function associated with the predicting the second trajectory.

18. The system of claim 11, wherein the deviation comprises a difference between at least one of a speed and a direction of the first trajectory of the vehicle and the first ground truth trajectory of the vehicle.

19. The system of claim 11, wherein the machine learning model comprises an inverse reinforcement learning (IRL) model.

20. The system of claim 11, the operations further comprising:
receiving, by the at least one processor, sensor information (e.g., radar signal, images, LiDAR signal, GPS signal, etc.) about a second environment comprising the vehicle;
predicting, by the machine learning model, a third trajectory of the vehicle in the second environment based on the sensor information; and
operating, by the at least one processor, the vehicle in a third environment based on the third trajectory.

21. At least one non-transitory storage media storing instructions that, when executed by at least one processor, cause the at least one processor to perform operations comprising:
predicting, by at least one processor, using a machine learning model, a first trajectory of a vehicle at a first time in a simulated environment that is simulated as surrounding the vehicle, the simulated environment comprising at least one object;
receiving, by the at least one processor, from a simulator, environmental parameters characterizing the simulated environment surrounding the vehicle;
detecting, by the at least one processor, based on processing the environmental parameters, a deviation of the first trajectory at the first time from a first ground truth trajectory of the vehicle and determining that, at the first time, the deviation satisfies a threshold;
predicting, by the at least one processor, using the machine learning model, a second trajectory of the vehicle based on the first trajectory of the vehicle and a second ground truth trajectory of the at least one object at a second time, the second time being subsequent to the first time; and
generating, by the at least one processor, a training dataset for training the machine learning model using the predicted first and second trajectories of the vehicle.

22. A method comprising:
predicting, by at least one processor, using a machine learning model, a first trajectory of a vehicle at a first time in a simulated environment that is simulated as surrounding the vehicle, the simulated environment comprising at least one object;
receiving, by the at least one processor, from a simulator, environmental parameters characterizing the simulated environment surrounding the vehicle;
detecting, by the at least one processor, based on processing the environmental parameters, a deviation of the first trajectory at the first time from a first ground truth trajectory of the vehicle and determining that, at the first time, the deviation satisfies a threshold; and
predicting, by the at least one processor, a second trajectory of the vehicle based on the first trajectory of the vehicle and a second ground truth trajectory of the at least one object at a second time, the second time being subsequent to the first time.

23. The method of claim 22, further comprising simulating, using the simulator, the simulated environment to generate the first ground truth trajectory of the vehicle at the first time.

24. The method of claim 23, wherein the second ground truth trajectory of the at least one object at the second time is simulated based on a determination that the first trajectory of the vehicle at the first time matches the first ground truth trajectory of the vehicle at the first time.

25. The method of claim 22, further comprising simulating, using the simulator, a first environment to generate a third ground truth trajectory of the vehicle at the second time.

26. The method of claim 25, wherein the second ground truth trajectory of the at least one object at the second time is simulated based on a determination that the second trajectory of the vehicle at the second time matches the third ground truth trajectory of the vehicle at the second time.

27. The method of claim 22, wherein the deviation comprises a difference between at least one of a speed and a direction of the first trajectory of the vehicle and the first ground truth trajectory of the vehicle.

28. The method of claim 22, further comprising:
receiving, by the at least one processor, sensor information (e.g., radar signal, images, LiDAR signal, GPS signal, etc.) about a second environment comprising the vehicle;
predicting, by the at least one processor, a third trajectory of the vehicle in the second environment based on the sensor information; and
operating, by the at least one processor, the vehicle in a third environment based on the third trajectory.

29. The method of claim 22, further comprising causing the vehicle to operate based at least in part on the second trajectory of the vehicle and the second ground truth trajectory of the at least one object.

\* \* \* \* \*